United States Patent
Urvoy

(10) Patent No.: US 7,034,494 B2
(45) Date of Patent: Apr. 25, 2006

(54) SERVO-CONTROL UNIT FOR A VARIABLE PRESTRESSED LOAD

(75) Inventor: Emile Urvoy, Roussigny (FR)

(73) Assignee: GIAT Industries, Versailles (FR)

( * ) Notice: Subject to any disclaimer, the term of this patent is extended or adjusted under 35 U.S.C. 154(b) by 0 days.

(21) Appl. No.: 10/492,409

(22) PCT Filed: Oct. 7, 2002

(86) PCT No.: PCT/FR02/03410

§ 371 (c)(1),
(2), (4) Date: Apr. 12, 2004

(87) PCT Pub. No.: WO03/031844

PCT Pub. Date: Apr. 17, 2003

(65) Prior Publication Data

US 2004/0263107 A1 Dec. 30, 2004

(30) Foreign Application Priority Data

Oct. 10, 2001 (FR) .................................. 01 13016

(51) Int. Cl.
*G05B 11/01* (2006.01)
(52) U.S. Cl. ...................... 318/630; 318/432; 318/433; 318/434
(58) Field of Classification Search ................ 318/630, 318/432, 433, 434, 3, 12, 15
See application file for complete search history.

(56) References Cited

U.S. PATENT DOCUMENTS

| 3,238,803 A | | 3/1966 | Durand ........................ 74/409 |
| 4,060,010 A | * | 11/1977 | Heden .......................... 475/183 |
| 5,359,884 A | * | 11/1994 | Fey et al. .................... 73/118.1 |

FOREIGN PATENT DOCUMENTS

| FR | 2 538 136 | 6/1984 |
| GB | 1135512 | 12/1968 |

* cited by examiner

*Primary Examiner*—Karen Masih
(74) *Attorney, Agent, or Firm*—Steptoe & Johnson LLP

(57) ABSTRACT

The invention relates a servo-control unit for a load (2) driven in rotation by motorization means (1) connected to the Load by two reduction gears (3, 4) and comprising several sensors for measuring their movements It includes a prestressing motoring system (5) arranged between the two reduction gears (3, 4) so as to apply a positive and respectively a negative torque to each of the reduction gears. The prestressing system (5) is designed to apply a torque at any particular point of the operating field of the reduction gears and to introduce therein a variable prestressing level. The prestressing system (5) is a jack (14) driven by a motor (17) and co-operating with a rack or a screw-nut system (15). The invention is useful for motorization of a turret mounted on a vehicle.

12 Claims, 5 Drawing Sheets

SERVO-CONTROL UNIT FOR A VARIABLE PRESTRESSED LOAD

BACKGROUND OF THE INVENTION

The technical scope of the present invention is that of devices to drive a load with reduced or no backlash between the motor and the load.

When a load is driven in movement, and notably in rotation, the backlash between said load and the drive motor must be reduced to a minimum so as to obtain the precise positioning of the load with respect to a given reference. This problem is of extreme importance within the scope of the laying of a weapon mounted in the turret of an armed vehicle.

Various principles to eliminate any backlash are known and used in various branches of the technique.

By way of illustration, patent FR-2221981 proposes two independent and slightly opposing chains to eliminate the problems of backlash, but using two motors. This is the main drawback to this device.

Patent FR-2538136 proposes to release the servo-driven chain from the elasticity of the transmission so that the motorisation is comparable to that of a torque motor connected directly to the load. In the proposed system, the motorisation is constituted by a motor connected to the load by two reduction gears whose elasticity is employed to eliminate the backlash in a transmission by reduced prestressing. This reduced prestressing is enough to absorb the different homokinetic type errors that may appear between motor and load. This system is perfectly well adapted when the ratio between the elasticity of the reduction gears and the maximal homokinetism error is high.

However, when the harmonisation errors exceed around 10% of the clearance between the motor and the load required to transmit the maximum motorisation torque, the principle of approximately fixed prestressed load is used to avoid the arcing of two chains set in parallel, locally or globally over the full kinematics. The invention aims to supply a device having this property.

BRIEF SUMMARY OF THE INVENTION

The invention thus relates to a servo-control unit for a load driven in rotation by means of motorisation connected to the load by two reduction gears and comprising sensors for measuring their movements, wherein it comprises a prestressing motoring system arranged between the two reduction gears so as to respectively apply a positive and a negative torque to each of the reduction gear.

Advantageously, the prestressing system is designed to firstly apply to a torque at any point of the operating field of the reduction gears and secondly to introduce therein a variable prestressing level.

According to a first embodiment, the prestressing system is a jack driven by a motor and co-operating with a rack or a screw-nut system.

Advantageously, the prestressing system comprises a power stage box having an epicyclic gear train.

According to another embodiment, the device comprises prestressing inputs on the crown of the reduction gear with prestressing motorisation provided by hydraulic jack and pressure servo.

According to yet another embodiment, the prestressing system is a double reduction chain assembly integrating a jack and at least one input pinion whose axis of rotation has a degree of freedom with respect to said assembly.

Advantageously, the pinion is connected to the output of said assembly by an Oldham coupling type system.

Advantageously again, the device comprises a connecting rod hinged so as to ensure the radial displacement of the pinion.

According to yet another embodiment, one of the reduction gears has a slant toothed gear stage.

Advantageously, the pinion of the stage has an axial degree of freedom with respect to the wheel, said degree of freedom being used to modify the prestressing of the two chains by a back-geared motor.

According to yet another embodiment, the prestressing means comprise a jack allowing the reduction gears to be applied to the load.

Advantageously, the prestressing motorisation system incorporates electrical control means.

Additionally, the principle of dual motorisation may be applied, both chains of which are respectively used to supply the positive torque and negative torque to be transmitted to the load. In this case, the prestressing is made actively by specific control of the motorisations of each of the chains, thereby ensuring the transmission of positive or negative torques to the load without having to pass through the backlash of the transmission chains.

The invention applies in particular to systems having a lot of backlash between the motor and the load, such backlash being non negligible in relation to the angular strain of the transmission under the maximum stress to be transmitted. The second particularity lies in that the system is particularly sensitive to friction torques in the transmission both from a final accuracy but also an energetic point of view.

BRIEF DESCRIPTION OF THE DRAWINGS

Other characteristics, particulars and advantages of the invention will become more apparent from the following description, given by way of illustration and in relation to the appended drawings, in which.

BRIEF DESCRIPTION OF THE INVENTION

Figure 1:
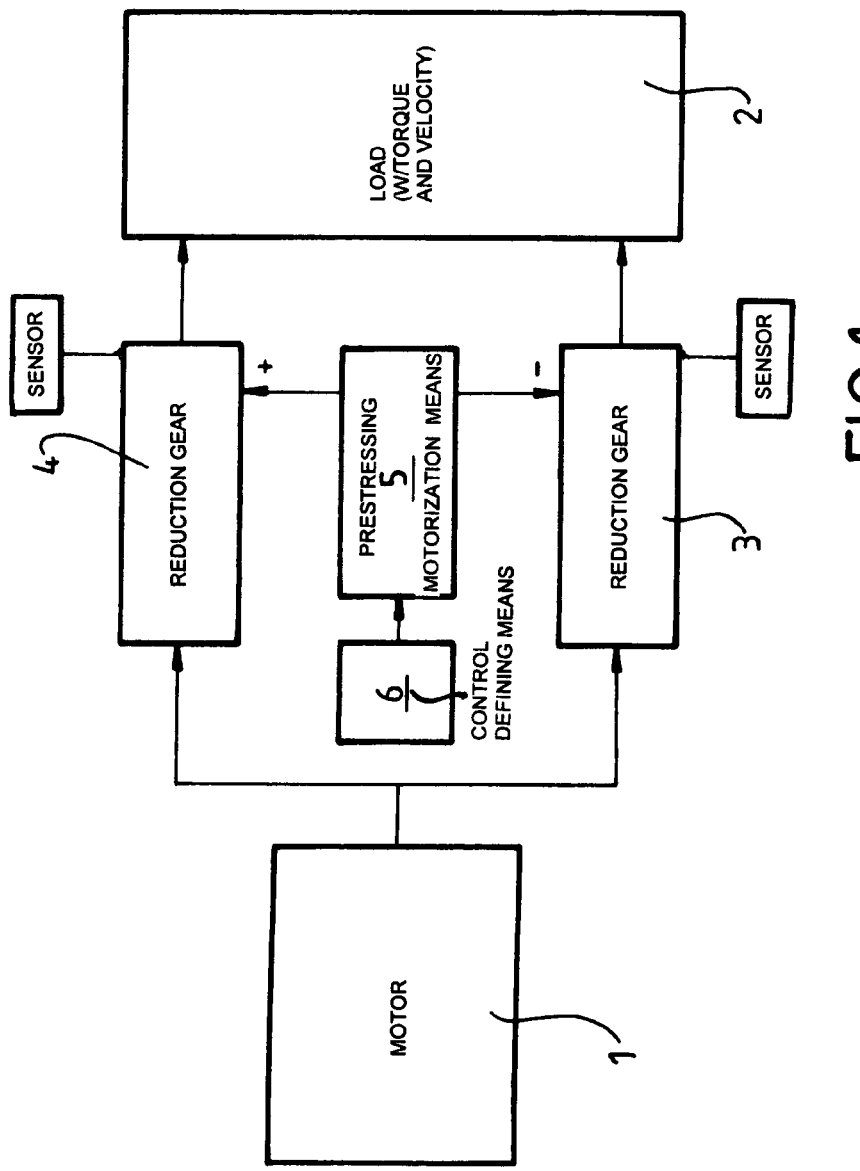
FIG. 1 is a general schematic illustration of the device according to the invention.

FIG. 1 shows that the device according to the invention schematically comprises a motor 1 dimensioned so as to supply a load 2 with torque and velocity. Between the motor 1 and the load 2 a double reduction chain is placed which comprises reduction gears 3 and 4 to connect the load to the motor. Prestressing motorisation means 5 are placed between the reduction gears 3 and 4, each provided with an input in a position used by the prestressing motorisation means. Naturally, this control allows a desired level of prestressing to be introduction. Lastly, a specific means 6 allow the controls made by the means 5 to be defined.

The structure thus described allows the reduction chains to be adapted to the different natural anomalies of the transmission system, which with zero torque transmitted in each of the chains, corresponds to the relative position between the motor 1 and the load 2 in which may be included:

the influence of the temperature variation on the differential dilations between the gear housing and the internal mechanical elements.

the ovalization errors of a toothed or circular sector, the homokinetism errors between the motor and the load, due to errors in the tooth formation of the gears.

According to the mechanical reduction principle used, the system to add the prestressing may take various forms. These will be classified into two families respectively corresponding:

to all the electromechanical systems allowing an additional angular displacement to be added in each of the chains. The fact in particular that there is little clearance to be added is exploited. For example, this limited displacement may be obtained by a radial relative displacement between the output pinions and the sector or circular gear to be driven. The potential degree of freedom of a reduction stage by epicyclic train may also be used to introduce the required variable. Another variant lies in the use of the axial displacement of a slant toothed reduction pinion to recover the required degree of freedom, to using a hydraulic jack type system with pressure servo, which constitutes a well adapted means to ensure the contact, of both chains with no backlash and with controlled arcing.

The nominal advantage of the variable prestressing motorisation system lies in that it constitutes a device that firstly compensates for the differential homokinetic variations between the two reduction chains and secondly increases the prestressing of the torque to be transmitted during transmission. This optimisation of the prestressing torque in fact allows the friction torque in the motorisation chain to be minimised and thus its corresponding effect firstly upon the accuracy of the load's servo system and secondly on the energetic cost of the motorisation control. In fact, fixed prestressing systems allowing an approximately constant rigidity of the motorisation chain to be ensured in all the range of torques to be transmitted and in that of the positions of the load directly result in the increase in the level of the friction torque to be overcome with the dual disadvantage on the accuracy of the load's servo system and on the energetic cost of the control.

The means proposed to vary the prestressing, using the control, in the motorisation chain must therefore be associated with adapted controls. In these controls will be differentiated firstly the principle allowing the instantaneous torque to be applied in the prestressing chain to be associated with the control principle allowing this prestressing to be made on the secondary chain.

The processing to be made on the signal to be picked up from the main chain is a conventional processing allowing a prestressing torque value corresponding to an absolute value of the maximum torque to be determined. Principles of the double alternation filtering type may usefully be applied. As for the prestressing chain torquing control, any means, either to measure the prestressing torque set in the transmission system or to identify the requirement in angular position of the prestressing motor corresponding respectively to the homokinetism errors to be overcome and to the additional angle corresponding to the prestressing torque to be established, may be employed.

Figure 2:
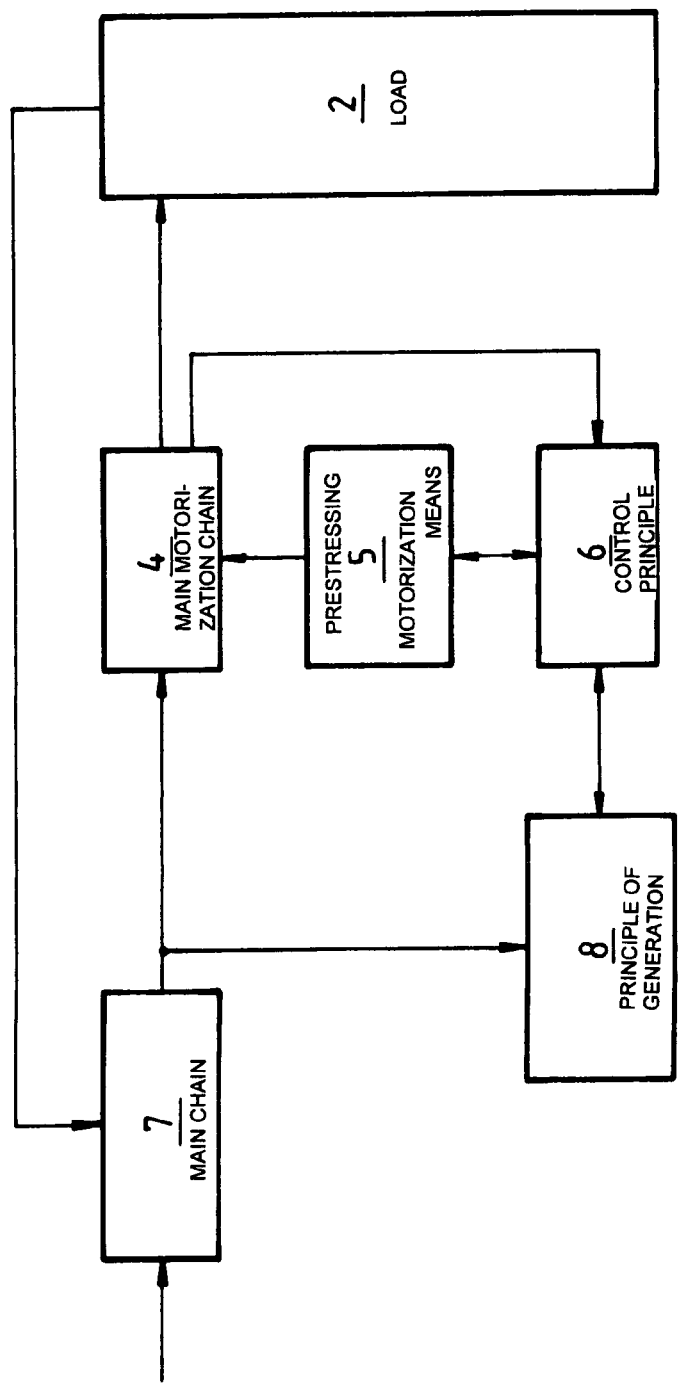
FIG. 2 is a general block diagram of the device according to the invention.

FIG. 2 shows a general block diagram illustrating, firstly, the main motorisation chain 4 organised so as to allow a prestressed adjustment input to be introduced into the reduction chain of the control of the main chain 7, and secondly, the principle of generation 8 of the variable prestressed torque using the estimation of the instantaneous torque to be set into the main chain 7 and the control 6 principle establishing the prestressing.

The concept of a back-geared motor having variable prestressing is not specific to a particular gear reducing principle. It is however necessary to introduce local modifications allowing at the least a prestressed input into the double chain of the reduction gear. By way of an example, we quote the following means to perform variable prestressing:

epicyclic train power stage boxes with prestressed inputs of the crown gear with motorisation of the prestressing by hydraulic jack and pressure servo-control, or electrical micro-jack controlled in position.

double-reduction chain box with at least one output gear whose axis of rotation has a degree of freedom relative to the box (radial or circular). The pinion is connected to the box output by an Oldham coupling type system and the relative position of its axis in relation to the circular is adjusted by a servo motorisation in position.

a double chain reduction gear one stage of which is made of slanted toothed gear. The associated pinions have an axial degree of freedom with respect to the box, this degree of freedom being used to modify the prestressing in the two chains by a back-geared motor type system.

an oscillating aiming box and circular box adjusting mini-jack.

eccentric rollers on a rack.

These embodiments are exemplified as follows.

Figure 3:
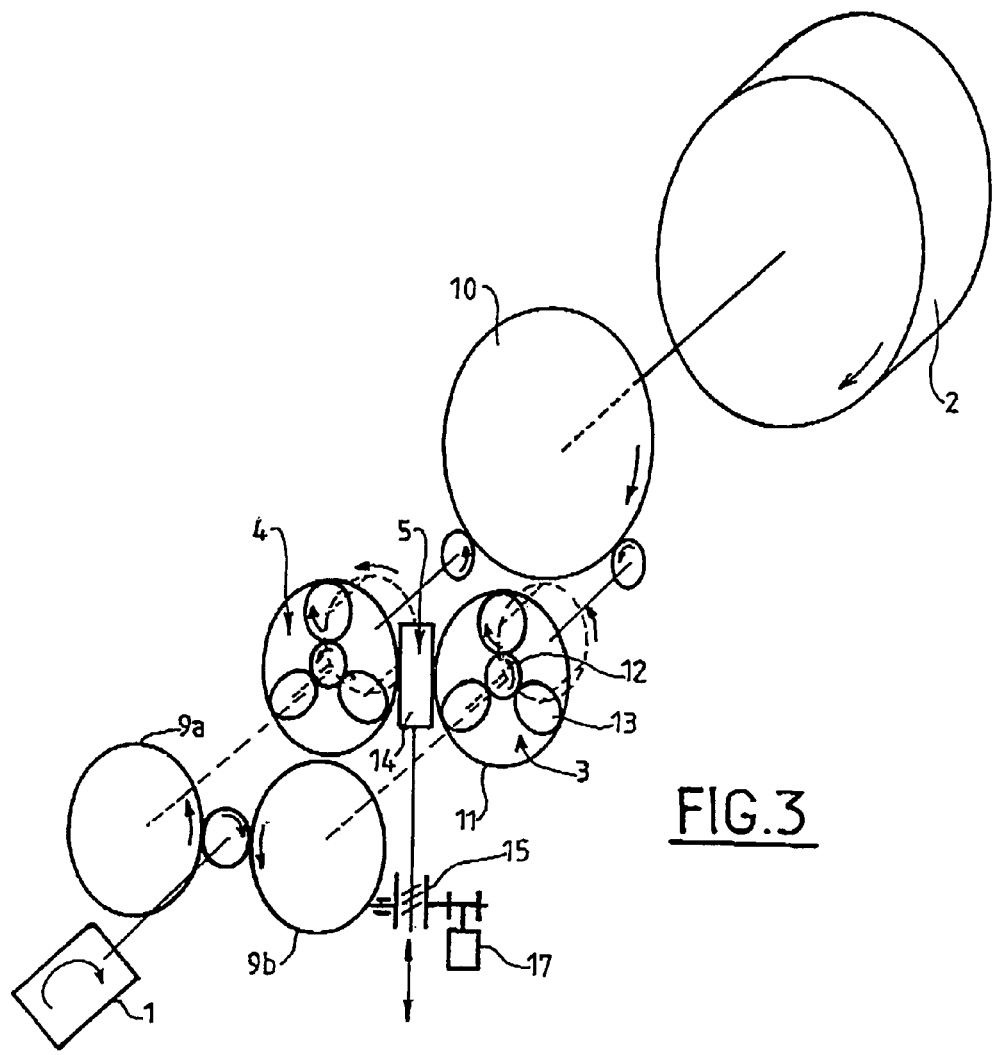
FIG. 3 shows a first embodiment of the invention.

FIG. 3 shows a perspective view of an embodiment of the prestressing system 5 integrated into epicyclic train reduction gears 3 and 4. Between the motor 1 and the load 2, there are, in order, the input pinion 9a or 9b, the epicyclic gear train 3 or 4, and the output wheel 10. The epicyclic train 3 or 4 classically comprises an immobile crown gear 11 with inner toothing, and input pinion 12 and three planet gears 13 meshing on the inner toothing of the crown gear. According to the invention, a prestressing is introduced by making the crown gear 11 mobile in both directions by means of a slight rotation. By slight rotation, we mean a rotation of around 5°. This rotation is obtained using a double rack 14 driven in translation by an electrical prestressing jack 15–17. This jack is of a known type and will not be described in further detail.

Figure 4:
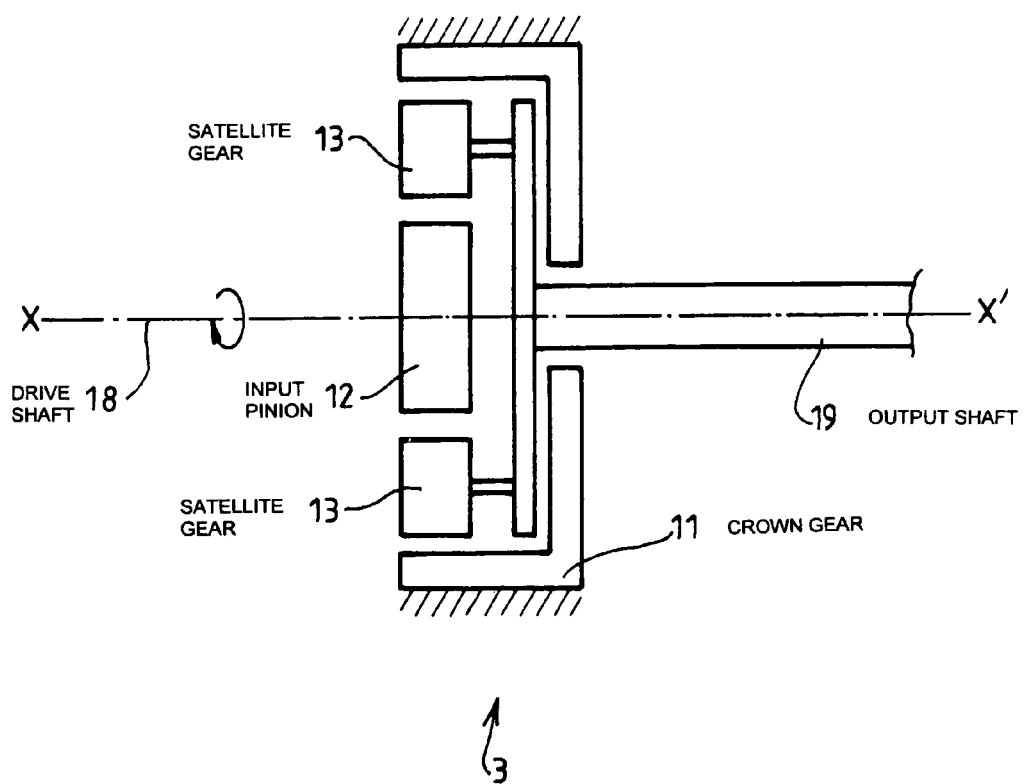
FIG. 4 shows an epicyclical train.

FIG. 4 illustrates the classical structure of the epicyclic gear train where we find the input pinion 12 integral with the drive shaft 18 (connected to the motor 1) aligned along the drive axis XX', the satellite gears 13 integral with the output shaft 19, also aligned along axis XX'. Classically, the satellites 13 mesh on the inner toothing of the crown gear 11. This crown 11 is classically immobile with respect to its support and is made mobile in the invention so as to introduce the variable prestressing as explained previously.

Figure 5:
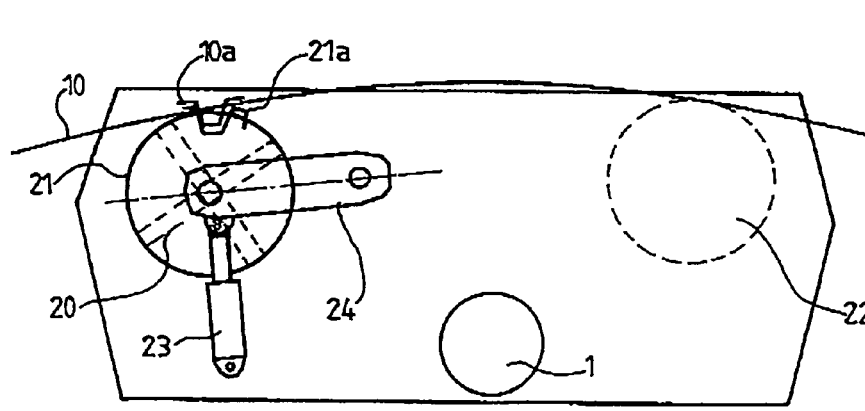
FIG. 5 shows a second embodiment of the invention.

FIG. 5 shows another embodiment of the variable prestressing means. It corresponds to a back-geared motor with a double reduction chain between a motor 1 and the load 2. Each of the two reduction gears mesh on the inner wheel 10 respectively via pinions 21 and 22. Pinion 21, is angularly connected to the box output axis by a coupling 20 of an Oldham type. A hinged connecting rod 24 allows the radial displacement of the pinion 21 with respect to the circular 10.

The radial displacement or pinion 21 causes a relative angular displacement of pinion 21 with respect to pinion 22, thereby modifying the prestressing. The jack 23 allows this prestressing to be adjusted.

Figure 6:
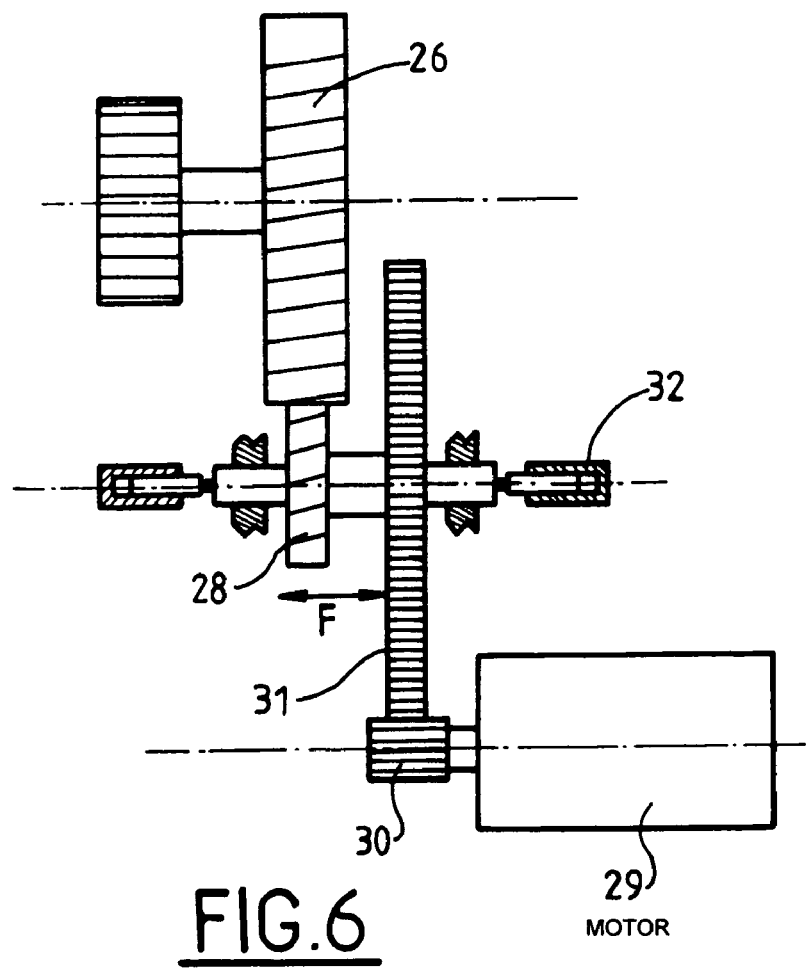
FIG. 6 shows a third embodiment of the invention.

FIG. 6 shows a section of another embodiment of prestressing means according to which the reduction stage is constituted by slant toothed pinions. Thus, the wheel 26 meshes with pinion 28 via its slanted toothing. The pinion 28 is driven by the motor 29 by pinions 30 and 31. To adjust the prestressing, pinion 28 is caused to translate, using the positioning jack 32. The displacement of pinion 28 following arrow F allows it to be more or less meshed in the toothing of wheel 26 thereby causing the prestressing to vary. The figure does not feature the second reduction chain, which is quite classical.

Figure 7:
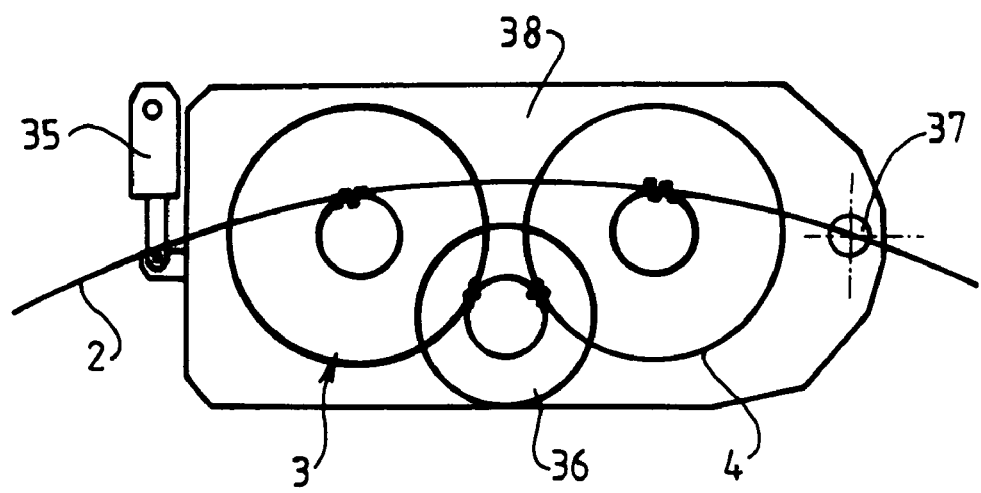
FIG. 7 is a section view of a fourth embodiment of the invention.

FIG. 7 shows another embodiment of prestressing means. It comprises a prestressing jack 35 allowing the reduction gear 3 and 4 to be applied in an adjustable manner against the toothing of the load 2. The figure shows the main motor 36 and the axis 37 of articulation of the back-geared motor. Naturally, the jack 35 is placed between the gear housing 38 and the support for the load 2.

What is claimed is:

1. A servo-control unit for a load drive in rotation by motorization means connected to the load by two reduction gears and comprising sensors to measure their movements, wherein it comprises a prestressing motoring system arranged between the two reduction gears so as to respectively apply a positive and negative torque to each of the reduction gear.

2. A servo-control unit according to claim 1, wherein the prestressing system is able to firstly apply a torque at any point of the operating field of the reduction gears and secondly introduce into it a variable prestressing level.

3. A servo-control unit according to claim 2, wherein the prestressing system is a jack driven by a motor and co-operating with a rack or screw-nut system.

4. A servo-control unit according to claim 1, wherein the prestressing system comprises a power stage box having an epicyclic gear train.

5. A servo-control unit according to claim 4, wherein it comprises prestressing inputs on the crowns of the reduction gear with prestressing motorization provided by hydraulic jack and pressure servo-control.

6. A servo-control unit according to claim 4, wherein the prestressing system is a double reduction chain assembly integrating a jack and at least one input pinion whose axis of rotation has a degree of freedom with respect to said assembly.

7. A servo-control unit according to claim 6, wherein the pinion is connected to the output of said assembly by an Oldham coupling type system.

8. A servo-control unit according to claim 7, wherein it comprises a connecting rod hinged so as to ensure the radial displacement of the pinion.

9. A servo-control unit according to claim 4, wherein one of the reduction gears has a slant toothed gear stage.

10. A servo-control unit according to claim 9, wherein the pinion of the stage has an axial degree of freedom with respect to the wheel, said degree of freedom being used to modify the prestressing of the two chains by a back-geared motor.

11. A servo-control unit according to claim 4, wherein the prestressing means comprise a jack allowing the reduction gears to be applied to the load.

12. A servo-control unit according to claim 1, wherein the prestressing motorization system incorporates electrical control means.

* * * * *